Figure 1:
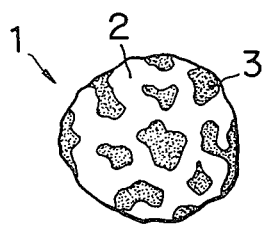

United States Patent [19]
Tanaka et al.

[11] 3,960,771
[45] June 1, 1976

[54] COMPOSITE ADSORBENT

[75] Inventors: Hiroshi Tanaka; Takuo Tanaka; Takeshi Tanaka, all of Nagahama, Japan

[73] Assignee: Japan Synthetic Rubber Co., Ltd., Tokyo, Japan

[22] Filed: Apr. 17, 1974

[21] Appl. No.: 461,484

[30] Foreign Application Priority Data
Apr. 20, 1973  Japan .............................. 48-45508

[52] U.S. Cl. ................................ 252/446; 55/389; 55/523; 252/184; 428/404; 210/39; 210/502
[51] Int. Cl.² ........................................ B01J 21/18
[58] Field of Search ................... 55/68, 73, 74, 387, 55/389, 390, 522, 523, DIG. 16, 41; 161/160, 411, DIG. 5; 252/1, 184, 446; 210/39, 502; 428/402, 403, 404

[56]  References Cited
UNITED STATES PATENTS

| 1,972,368 | 9/1934 | Alex .................................. 252/446 |
| 2,480,753 | 8/1949 | McCarter ........................... 252/446 |
| 3,016,355 | 1/1962 | Robinson et al. ................... 252/446 |
| 3,658,724 | 4/1972 | Stiles ................................. 252/446 |

Primary Examiner—William J. Van Balen
Assistant Examiner—William R. Dixon, Jr.

[57] ABSTRACT

A composite adsorbent comprising particles of activated clay and fine powder of active carbon randomly adhered on the surfaces of the particles. The composite adsorbent is suitable for use in a gas flow transfer contact system for deodorization of an odorous mixture gas.

4 Claims, 2 Drawing Figures

COMPOSITE ADSORBENT

FIELD OF THE INVENTION

This invention relates to an adsorbent for removal by adsorption of diversified odorous matters from a mixed gas, and more particularly, to a composite adsorbent which is particularly suitable for use in a gas flow transfer type contact system.

BACKGROUND OF THE INVENTION

For removal of odorous matter from a gaseous mixture, there have been proposed and put into practice a variety of deodorization methods, which may be broadly classified into (1) absorption methods, (2) oxidation methods, and (3) adsorption methods. However, the existing methods in these three categories are incomplete or disadvantageous from either a technical or economical viewpoint.

Odorous offensive gases are generally produced as a result of operations in industrial plants and factories in various fields and are generally in the form of a mixture gas which contains diversified matter. Most of the offensive odor-emitting matters are extremely near their threshold values at which the odors become unperceivable, and thus it appears very difficult to effect complete deodorization of a gaseous mixture which contains diversified odor-emitting matters. In this connection, according to Weber-Fechner's law, 99% removal of an offensive odor-emitting matter gives a deodorization effect as low as about 70%. Thus, the removal of an odorous matter even in the order of 99% is not considered to be practically satisfactory. It is only when a removal in the order of 99.9 – 99.99% is attained that practically feasible deodorizing effects are obtained.

It is almost impossible to carry out complete deodorization by an absorption method, in consideration of the absorption mechanism involved. With regard to the oxidation deodorization, the theoretical direct flame combustion method has a possibility of complete deodorization but it is impractical from an economical point of view. Moreover, a catalytic combustion type deodorization method has problems yet to be solved such as of that of catalyst poisoning and therefore has limitations in practical applications.

For removal of odorous matters or substances which are contained in low concentrations in a gas, an adsorption method is considered the most suitable from both theoretical and practical points of view as practically complete deodorization can be expected with a removal efficiency of 99.99% or greater. However, the adsorption deodorization method has also various problems to be solved, of which the most important one is the selection of an adsorbent which is capable of adsorbing diversified matters and which is available at a reduced production cost.

In general, matters or substances contained in gases and vapors to be adsorbed are diversified in chemical and physical properties, i.e., they may have saturated bonds, unsaturated bonds or both, may be non-polar or polar in different degrees, may have an ion bond, may be hydrophobic or hydrophilic, and may be different in particle size. Particularly in the adsorption of diversified matters or substances contained in a composite or mixture gas as in the deodorization of an exhaust gas, it is desirable to employ an adsorbent capable of simultaneously adsorbing various kinds of substances.

Industrially used solid adsorbents are broadly classified into three categories, i.e., (A) carbonaceous adsorbents, (B) silica-alumina-base adsorbents and (C) resin-base adsorbents. Representative of the carbonaceous adsorbents is active carbon and of the silica-alumina-base adsorbents is activated clay. The active carbon adsorbents are available in a variety of preparations depending upon the nature of the materials and the processes employed for the preparation thereof. The silica-alumina-base adsorbents include terra abla, activated bauxite, silica gel, alumina gel, natural and synthetic zeolite or the like. Furthermore, the resin-base adsorbent is versatile in nature depending upon the starting materials and the processes for the preparation thereof.

According to a classification by inherent selective adsorption characteristics, the carbonnaceous adsorbent belongs to a non-polar adsorbent class with slightly hydrophobic properties, and can adsorb non-polar saturated compounds almost irrespective of the kind of their functional groups, while the silica-alumina-base adsorbents belong to a hydrophilic polar adsorbent class which selectively adsorbs polar group-containing compounds and/or unsaturated organic compounds having a double or triple bond. The resin-base adsorbent class includes non-polar or highly polar adsorbents.

Among the above-mentioned adsorbents, it is only the active carbon and a certain other kind of carbonaceous adsorbent, which is imparted with a polar group by the use of granular lime, that are now used in industrial-scale gas-deodorization apparatus. The silica-alumina-base adsorbents and the resin-base adsorbent have only limited applications, due to their particular physical properties and/or high costs.

Among the non-polar adsorbents, the active carbon is considered most excellent in physical properties and lowest in cost while it is difficult to find a polar adsorbent having such excellent physical properties and low cost as compared to the non-polar active carbon.

Though synthetic zeolite or a resinous adsorbent exhibits excellent physical properties, it can not be used in industrial gas-deodorization apparatus due to its prohibitively high cost. Furthermore, application of activated bauxite, silica gel or alumina gel is limited to dehydration and removal of moisture, and terra abla is inferior in adsorptivity. In this connectin, however, activated clay which is a polar adsorbent can be industrially employed as a gas-deodorization adsorbent. Additionally, the activated clay is low in cost and, with the exception of terra abla, is available at a cost about one-third that of activated bauxite, about 1/10 that of silica gel, about 1/15 of alumina gel, about 1/15 that of activated carbon, about 1/40 that of resin-base adsorbents and about 1/100 that of synthetic zeolite.

For use on an industrial scale, the adsorbents are generally required to have, in addition to excellent adsorptivity and activity, satisfactory physical properties such as (1) particulate structure strengths, (2) abrasion resistance, (3) thermal resistance, and (4) non-disintegrability in water. However, the molded particles of activated clay usually do not meet the above-mentioned requirements (1) through (4). This is the main reason why activated clay has never been employed for adsorption in gas phase.

The fact that activated clay has not been satisfactorily used in a gas-adsorption apparatus on an industrial scale is partly attributable to noncompliance of the activated clay to the requirements or conditions imposed by existing gas adsorption apparatus.

Known gas-adsorption systems may be classified as follows:
1. A fixed-bed type system wherein gases are passed though a layer filled with a granular adsorbent.
2. A moving bed type system wherein gases are brought into contact with a moving granular adsorbent.
3. A fluidized bed type system wherein substances contained in a gas to be adsorbed are adsorbed while fluidizing a granular adsorbent with the gas.
4. A gas flow transfer contact type system wherein a powdered adsorbent is dispersed in a gas stream and is transferred in a parallel flow with the gas stream to have odorous substances in the gas adsorbed thereinto during the transfer.

Most of the existing gas-adsorption apparatus are constructed according to any one of the above systems (1) through (3). Adsorbents to be employed in the systems (1) through (3) are invariably required to have excellent particle strength, abrasion resistance, thermal resistance and non-disintegrability in water, as described hereinbefore, due to the principles or manner of adsorption employed by these systems. However, in the gas flow transfer contact type system (4), the above-mentioned physical properties are not necessarily required since the adsorbent is used in the form of powder having a particle size of 1–150$\mu$ and it is possible to select an adsorbent of suitable property depending upon the kind of substances to be adsorbed.

In order to remove odorous substances successfully from a composite gas through adsorption, it has been necessary to use a number of different adsorbents which are active respectively on different kinds of substances to be adsorbed. It is, however desirable that the adsorbent have capability of adsorbing diversified odorous substances alone.

It is therefore an object of the present invention to provide an adsorbent which is particularly useful in a gas flow transfer type adsorption system for deodorization of a mixture gas.

It is another object of the present invention to provide an adsorbent which is capable of adsorbing diversified gaseous substances, i.e., hydrophobic or hydrophilic, non-polar or polar, saturated or unsaturated substances or compounds.

It is a further object of the present invention to provide a composite adsorbent which has an intensive adsorption power and a great adsorption capacity as compared with those of a unitary adsorbent.

It is a still further object of the present invention to provide a composite adsorbent which is low in cost.

It is another object of the present invention to provide a composite adsorbent which can be effectively used for deodorization of an industrial exhaust gas.

Figure 2:
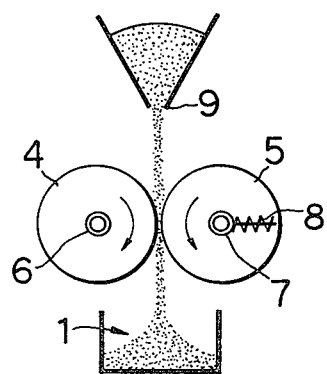

Other objects and advantages, and features of the present invention will become apparent from the following description when taken in conjunction with the accompanying drawings, wherein:

FIG. 1 is an outer view on an enlarged scale of a composite adsorbent according to the present invention; and FIG. 2 is a diagrmatic view showing an apparatus employed for producing the composite adsorbent of the invention.

The composite adsorbent in accordance with the present invention comprises globular activated clay particles or granules used as a substrate component and fine powder of soft active carbon which is discontinuously embedded on or adhered to the surface layer of the particles or granules. That is, the composite adsorbent of the invention is characterized by a combination of activated clay as a polar adsorbent and active carbon as a nonpolar adsorbent.

Generally, the weight ratio of the activated clay to the active carbon is within a range of 5:1–3:1. Referring now to FIG. 1, the composite adsorbent 1 of the invention comprises a particle of activated clay 2 and active carbon powder 3 embedded or deposited on the surface of the activated clay particle 2. The composite adsorbent 1 can be produced, for example, by an apparatus as shown in FIG. 2, which apparatus comprises a pair of squeezing rollers 4 and 5 of a hard, abrasion-resistant rubbery material. The squeezing rollers 4 and 5 are supported on a fixed bearing 6 and a movable bearing 7, respectively, the moving bearing 7 being provided with a spring 8 for suitably controlling the contact pressure between the two squeezing rollers 4 and 5. The roller 5 is rotated at a speed about 2–3 times greater than that of the other roller 4 to provide a forced frictional contact therebetween.

Above the two squeezing rollers is located a hopper 9 for feeding a mixture of particulate activated clay having a particle size of 70$\mu$–150$\mu$ and finely powdered soft active carbon having a size of 10$\mu$–40$\mu$. When the mixture is fed between the rotating rollers 4 and 5, the finely powdered soft active carbon is frictionally embedded or deposited on the surfaces of a relatively largesized and hard activated clay granules due to the difference in rotational speed between the squeezing rollers.

Microscopic observation reveals that the composite adsorbent granule thus obtained is composed of activated clay and active carbon which is discontinuously or randomly embedded or adhered on the outer surfaces of the activated clay as shown in FIG. 1. The composite adsorbent has the particular adsorption characteristics discussed in greater detail hereinlater and exhibits or retains both polar and non-polar adsorption characteristics inherent to the respective starting materials.

If the composite adsorbent is dispersed in a composite waste gas for adsorption deodorization of odorous gas components, various kinds of hydrophobic, non-polar and saturated compounds are adsorbed by the active carbon on the surfaces of the composite adsorbent, while hydrophilic, polar and unsaturated compounds are adsorbed by the activated clay.

In order to facilitate the understanding of the mechanism of adsorption by the composite adsorbent of the present invention, the following description illustrates the behaviors of $H_2O$ and $C_6H_5OH$ which are adsorbed in the fine pores on the active carbon surface by Van der Waals force.

The average particle size of active carbon pores is within a range of about 12–32A, so that, in the active carbon-water vapor phase, there occurs almost no adsorption at room temperature (25°C) in a relative humidity of less than 50%. This can be proved in terms of Kelvin's equation of capillarity on the basis of the pore size of the active carbon and capillary condensation phenomena which occur due to hydrophobic property of the active carbon.

When $H_2O$ molecules are adsorbed in several layers on the pore surfaces of the active carbon (in this instance, it is unconceivable that the water molecules which are assumed to have a size of 2.89A take a form of liquid with a collected size less than 10A ), the water molecules are condensed on the surfaces in a liquid state. Thus, in spite of the non-polar and hydrophobic properties of the active carbon, water adsorption occurs at a higher relative humidity. On the other hand, the quantity of static adsorption equilibrium of phenol on active carbon is about 30%. Phenol is soluble in water in an amount of 6 g per 100 g of water at a normal temperature under a normal pressure. Accordingly, the surfaces of the active carbon are covered partly with water molecules and partly with phenol molecules, both molecules being in contact relation with each other. The phenol which is in contact with water molecules is dissolved in the water phase since the phenol has a hydroxyl group and is hydrophilic, according to the principle that "like dissolves like". In this manner, a portion of the phenol is miscibly transferred into the water and from a pore surface of the active carbon leaving the same in a free unoccupied state for adsorbing fresh phenol or water. Furthermore, when phenol molecules are impinged on the surfaces of adsorbed water molecules while being passed on the porous surfaces of the active carbon, they are influenced by the attractive force of the water acting on the hydroxyl group of the phenol molecules and all or a portion of the attracted phenol molecules is adsorbed or captured in the water phase. In other words, both water and phenol molecules are adsorbed upon the active carbon.

Now, the mechanisms of adsorption of $H_2O$ and $C_6H_5OH$ on activated clay which exists in contact with the active carbon will be discussed.

Generally, the pore size of an adsorbent has a close relation with its specific surface area. Activated clay has an average pore size of 80–180 A. For example, with a pore size of 26 A, the specific surface area of the clay reaches 120 m²/g. Activated clay generally has a pore size sufficient to admit almost all of gaseous substances to be adsorbed. In general, with a pore volume of 0.6–0.8 cm³/g, the specific surface area is within a range of 250–350 m²/g, which value is not necessarily much greater than that of active carbon. Though the specific surface area is an important factor in discussing adsorption phenomena in adsorbents, it is not reasonable to determine the quality of activated clay only in consideration of its specific surface area alone.

The theoretical basis of the present invention mainly resides in the peculiarities of the activated clay. The following description is an elucidation of the adsorption characteristics of the composite adsorbent of the present invention.

Activated clay can be obtained by acid treatment (e.g., sulfuric acid treatment) of terra abla. The crystalline structure of terra abla is a three-layer structure in which an octahedral aluminum layer is interposed between two tetrahedral layers of silicic acid. A portion of the aluminum is substituted with magnesium, and the dificiencies in electric charge due to the substitution is supplemented by collecting cations on the surfaces of the layer, holding the electric charges of the entire aluminum layer in equilibrium. The cations are exchangeable with and may be replaced by various kinds of other cations as in an ion-exchange resin. By the acid treatment, the cations are substituted with hydrogen to form clay acid. Then, a change occurs in the structure of the octahedral layer by its solubilization and the tetrahedral layer is converted into free silicic acid gel. The activated clay which is a product of an acid treatment of terra abla is improved especially in activity but has physical properties substantially similar to terra abla.

The inter-layer surfaces of activated clay which are exposed to air are covered with oxygen molecules and therefore act as if they had negative charges and therefore the opposing surfaces of the respective layers tends to attract dipoles, so that polar molecules are captured initially by a monolayer adsorption and then by a multilayer adsorption. The adsorbed molecules are capillarily condensed and fill the pores until they reach a break-through point as a result of saturation. This may be explained as follows: When polar molecules are adsorbed on activated clay, the surfaces of the adsorbed molecules become negatively charged, attracting polar molecules in multiple layers by electrostatic force to give rise to capillary condensation.

As is clear from the foregoing, due to its polar structure, activated clay is inherently effective for polar adsorption. The adsorption of non-polar or weakly polar molecules on activated clay is mainly attributed to Van der Waals force. Since Van der Waals force is non-directional, monolayer adsorption occurs on the surfaces of the activated clay without giving rise to normal molecular arrangement.

In this connection, the adsorption on activated clay, similarly to active carbon occurs by Van der Waals force and thus the molecules are adsorbed in monolayer. Capillary condensation occurs only for those molecules which are easily condensable.

As it is clear from the foregoing, in the polar adsorption, the ions which have been already adsorbed on the activated clay are not exchanged equivalently with other ions. Polar adsorption of organic compounds essentially requires that the organic compounds have a polar group or groups. Accordingly, the polar adsorption does not occur in saturated compounds. The adsorption of non-polar molecules on activated clay depends only upon Van der Waals force and occurs in a monolayer, so that the adsorption capacity of activated clay against non-polar substances is lower as compared with that of active carbon since the specific surface area of the activated carbon is smaller.

In general, inorganic or organic cations are adsorbed on the activated clay by an ion exchange reaction, wherein a positive charge-bearing polar compound is adsorbed on the negative chargebearing activated clay under the influence of the action of both electrostatic force and Van der Waals force. By reaction with the activated clay, inorganic or organic cations having a small size are adsorbed on the activated clay with the aid of electrostatic force, at the same time releasing by exchange therewith the equivalent cations which have been adsorbed on the activated clay. In this instance, organic cations having a relatively large size may also be adsorbed by Van der Waals force. Thus, the activated clay involves an ion-exchange reaction as in an ion-exchange resin.

As mentioned above, the activated clay has versatile adsorptivity, including Van der Walls adsorption, polar adsorption, ion-exchange adsorption and the like, so that it is capable of adsorbing diversified compounds or substances if used under conditions which suit the particular characteristics of the compounds or substances to be adsorbed.

The following description illustrates the adsorption of $H_2O$ and $C_6H_5OH$ on pore surfaces of the activated clay, by Van der Waals adsorption, polar adsorption and the like. The activated clay is a hydrophilic, polar adsorbent and accordingly water molecules contained in a gas feed are diffused into the pores of the activated clay by molecular diffusion. In general, an adsorbent such as active carbon which has a great specific surface area adsorbs a gas in a large amount at a static adsorption equilibrium; however, the adsorption amount becomes greater with a larger pore size in a dynamic adsorption process involving a gas at a suitable flow rate. This is believed due to a high gas diffusion velocity which is attained by a small diffusion resistance of the large-pored adsorbent and can be one of the valuable characteristics of the activated clay in practical applications.

Water molecules which have entered the pores of the activated clay have typically strong polarity and are adsorbed on the pore surfaces of the activated clay by the polar adsorption and condensed, while a portion of the phenol which have been diffused and entered the pores together with the water molecules is adsorbed on the pore surfaces of the activated clay due to its hydroxyl group. When the phenol reaches the pore surfaces which have already adsorbed water molecules, the hydroxyl group of the phenol is attracted by the condensed water and a portion of the phenol molecule is dissolved in the water phase according to the principle that like dissolves like. Both water and phenol are thus adsorbed on the activated clay.

The adsorption mechanisms of the active carbon and activated clay have thus far been described in relation to a case where the active carbon and the activated clay are independently or singly employed as an adsorbent.

The following is a description of adsorption characteristics unique to the composite adsorbent of the invention which consists of a combination of active carbon and activated clay, particularly with regard to adsorption of water and phenol. It will be understood that the following description is based on the assumption that the adsorption is effected under conditions suitable for the particular physical properties of the substances to be adsorbed.

Water and phenol are adsorbed on the active carbon and the activated clay through the adsorption mechanisms mentioned hereinbefore, respectively, at an initial stage of adsorption. Then, water and phenol which are adsorbed on the pore surfaces of the active carbon embedded in or bound under pressure to the outer surfaces of the activated clay are readily drawn or attracted by previously adsorbed water and phenol on the hydrophilic, polar activated clay since the active carbon is originally hydrophobic and non-polar, so that the water and phenol adsorbed on the active carbon are readily attracted and adsorbed by the water and phenol which are polarly adsorbed on the pore surfaces of the activated clay. As a result, a part of the pore surfaces of the active carbon becomes vacant. While, the adsorbed water surfaces on the activated clay acts as if negatively charged to further adsorb polar compounds. Furthermore, adsorbed phenol is normally arranged on the inter-layer water surfaces by multilayer adsorption due to the hydrophilic and polar properties of phenol. Thus, water and phenol which are adsorbed on the active carbon constituting a part of the surface layer of the composite adsorbent particles are constantly transferred to the activated clay and thus the amount of moisture or water adsorbed on the active carbon is held always smaller than the equilibrium moisture. That is, the active carbon serves as a catcher or capturing means. While, the moisture or water adsorbed in the activated clay adsorbs moisture or water which is transferred from the active carbon with increase in water content of the activated clay. However, the adsorbed water is partly evaporated to maintain a moisture equilibrium with the relative humidity of the gas. Accordingly, the adsorbed and dissolved substances are condensed almost to saturation.

As is clear from the foregoing, a portion of the free water contained in the activated clay is substituted with the adsorbed substances. In this connection, the activated clay generally contains non-bound water in an amount of about 12-15% at a normal temperature and normal relative humidity.

In the foregoing description, the adsorption mechanisms of the composite adsorbent of the present invention have been illustrated by way of particular substances to be adsorbed. However, this can also be applied to almost all substances when the composite adsorbent is employed under suitable conditions depending upon the characteristics of the respective substances to be adsorbed. That is, the composite adsorbent of the invention has a stronger adsorptive power and a greater adsorption capacity as compared with existing adsorbent using active carbon or activated clay alone, with synergestic effects of strong adsorption power due to Van der Waals force of the active carbon and great adsorption capacity due to polar adsorption power and large pore size and pore volume of the activated clay. The composite adsorbent can adsorb various kinds of substances in a mixture gas and is particularly suitable for use in deodorization of a waste gas which contains odorous polar organic compounds.

The practicality of an industrial gas adsorption deodorization apparatus largely depends upon the availability, and low cost of an adsorbent to be used. The composite adsorbent of the present invention has as its main component terra abla which occurs in large amount in nature and which is available at low cost on a commercial basis. This is far more advantageous than the combustion deodorization method which consumes petroleum oil in such a large amount as to jeopardize the prospect of a stable and constant supply. Thus, the composite adsorbent of the invention can greatly contribute to industrial adsorption and deodorization processes from technical and economical points of view.

The present invention will be particularly illustrated in the following example.

The following three adsorbents were subjected to an adsorption test
1. Powdered active carbon — 10 g
2. Powdered activated clay — 10 g
3. Powdered composite adsorbent of the invention — 10 g (1 g of powdered active carbon and 9 g of powdered activated clay).

Each test was conducted by using a gas-feeding apparatus which was provided with an adsorption bottle fitted with filters for preventing the escape of the adsorbent. The bottle was connected with the apparatus by means of a flexible rubber tube to permit shaking of the bottle for dispersing and floating the adsorbent within the bottle. After introducing the adsorbent into the bottle, a sample gas, i.e., ammonia gas, was introduced by means of a vacuum pump. The concentration of ammonia was adjusted to within a range of 50-500 ppm. The amount of the gas which was discharged from the vacuum pump was determined by means of a Kitagawa type detector. When the ammonia concentration of the gas reached about 50 ppm, clean dry air was introduced into the bottle at 20°C under 760 mmHg, followed by a weighing of the bottle by means of a chemical balance. The weighing was repeated until the weight of the bottle became constant. Prior to feeding the ammonia gas by suction, each sample was dried by means of clean dried air of 20°C under 760 mmHg.

The tests for each adsorbent were conducted under the following two different conditions.
  A. Relative humidity of gas — 54 % (Table A)
  B. Relative humidity of gas — 80 % (Table B)
The test results are shown in Tables (A) and (B) below Table (A)

| Sample No. | Weight Non-adsorbed | Weight After Saturation | Adsorption Capacity |
|---|---|---|---|
| 1 | 10 g | 10 g + Non-appreciable amount | Non-appreciable - % amount |
| 2 | 10 g | 10.63 g | 0.63 g - 6.3 % |
| 3 | 10 g | 10.72 g | 0.72 g - 7.2 % |

Table (B)

| Sample No. | Weight Non-adsorbed | Weight After Saturation | Adsorption Capacity |
|---|---|---|---|
| 1 | 10 g | 10 g + Non-appreciable amount | Non-appreciable - % amount |
| 2 | 10 g | 12.1 g | 2.1 g - 21 % |
| 3 | 10 g | 13.2 g | 3.2 g - 32 % |

The above values were determined with saturated adsorbents which had been dried to a constant weight by feeding clean dried air of 20°C and of 760 mmHg, so that the adsorption capacity values were not effected by changes in relative humidity of the gas.

Regarding the test conditions (A) and (B), it will be found that the adsorption power is greatly influenced by the relative humidities of the gas. That is, when the relative humidity is low, the adsorption capacity becomes small, whereas a high relative humidity results in a greater adsorption capacity. This is one characteristic property of the composite adsorbent of the invention.

Thus, the adsorption operation should be conducted under suitable conditions depending upon the particular properties or characteristics of substances to be adsorbed.

What is claimed is:
1. A composite adsorbent for the adsorption of gases comprising particles of activated clay and fine powder of active carbon randomly adhered to the surface of said particles, said particles of activated clay having a particle size of $70\mu$–$150\mu$ and said powder having a size of $10\mu$–$40\mu$, the pore size of the activated clay being greater than the pore size of the active carbon.

2. A composite adsorbent according to claim 1, wherein said active carbon is a soft carbon.

3. A composite adsorbent according to claim 1, wherein the weight ratio of said activated clay to said active carbon is within a range of 5:1–3:1.

4. A composite adsorbent for the adsorption of gases comprising particles of activated clay and fine powder of active carbon randomly adhered to the surfaces of said particles, said particles of activated clay having a particle size of $70\mu$–$150\mu$ and said powder having a size of $10\mu$–$40\mu$, the pore size of the activated clay being greater than the pore size of the active carbon, and the weight ratio of said activated clay to said active carbon being at least 3:1.

* * * * *